United States Patent
King et al.

(10) Patent No.: US 7,386,231 B2
(45) Date of Patent: Jun. 10, 2008

(54) METHOD AND APPARATUS FOR TESTING NETWORK DATA SIGNALS IN A WAVELENGTH DIVISION MULTIPLEXED OPTICAL NETWORK

(75) Inventors: Frederick Gordon King, San Jose, CA (US); Patrick Riley, Campbell, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 857 days.

(21) Appl. No.: 10/358,813

(22) Filed: Feb. 4, 2003

(65) Prior Publication Data

US 2004/0151494 A1    Aug. 5, 2004

(51) Int. Cl.
*H04B 10/08* (2006.01)
*H04B 17/00* (2006.01)

(52) U.S. Cl. ............................................ 398/27; 398/34

(58) Field of Classification Search .................... 398/1, 398/9, 16, 27, 34; 298/58, 82
See application file for complete search history.

(56) References Cited

U.S. PATENT DOCUMENTS

| 5,838,488 | A  | * | 11/1998 | Kobayashi ............. 359/341.41 |
| 6,178,025 | B1 | * | 1/2001  | Hardcastle et al. ........... 398/17 |
| 2002/0126352 | A1 | * | 9/2002 | Shake et al. ................ 359/124 |

\* cited by examiner

*Primary Examiner*—Shi K Li
(74) *Attorney, Agent, or Firm*—Mikio Ishimaru

(57) ABSTRACT

A method and apparatus for testing network data signals in an optical wavelength division multiplexing network employ an optical wavelength division multiplexing function and a network analysis function to analyze the optical spectrum and extract from and insert data signals into a wavelength division multiplexing network for data signal analysis by the network analysis function.

12 Claims, 3 Drawing Sheets

METHOD AND APPARATUS FOR TESTING NETWORK DATA SIGNALS IN A WAVELENGTH DIVISION MULTIPLEXED OPTICAL NETWORK

TECHNICAL FIELD

The present invention relates to the transmission of information over fiber optics, and more particularly to determining network and data integrity for wavelength multiplexed optical networks.

BACKGROUND ART

Optical Wavelength Division Multiplexing ("WDM") has become a standard technology for fiber optic communication systems for the transmission of voice, data, the Internet, etc. WDM systems employ signals consisting of a number of different, unique wavelengths or channels, to transmit information. Each wavelength channel is modulated by a data signal, typically in the form of a stream of bits, which encode the voice or Internet traffic. As a result, a significant number of data signals may be transmitted simultaneously over a single optical fiber using WDM technology.

Despite the substantially higher fiber bandwidth utilization provided by WDM technology, multiplexing and demultiplexing create a number of serious problems that must be overcome, such as cross-talk, equalization, chromatic dispersion, network management, and routing of the information signals, for such systems to be commercially viable. Testing and troubleshooting problems are also greatly complicated by the additional components and complexity of a WDM network. Without additional testing tools, network maintenance is very difficult, resulting in significant time and effort expended to install and maintain a WDM network.

Multiplexing involves the process of combining multiple signals (each signal on its own wavelength) into a single multiple wavelength WDM signal. De-multiplexing is the opposite process in which each single wavelength is extracted and decomposed from the multiple wavelength signal. Each signal is thus reconstructed to match the original information signal before multiplexing.

Each wavelength channel has the capability to carry several gigabits of binary data per second. This is also referred to as the modulation rate. As the modulation rate is increased, more data can be carried, since each bit transmitted causes the carrier signal to be modulated. The modulation rate is currently defined by industry standards, SONET ("Synchronous Optical NETwork") developed by the American National Standards Institute ("ANSI") in the United States and used in North America, and SDH ("Synchronous Digital Hierarchy") developed by the International Telecommunication Union ("ITU") and used throughout most of the rest of the world.

Currently, nearly all information transmitted over fiber, whether voice, data, Internet, or e-mail, is done using the SONET/SDH standard. However, other standards for transmission of high data rates are emerging, such as Gigabit Ethernet and 10 Gigabit Ethernet. The present invention applies to the transmission of SONET/SDH, Ethernet, or other standards or proprietary protocols that may emerge in the future.

Understandably, as with many standards, use of the SONET/SDH standard has become not only typical but effectively required, because both the network transmitter and the network receiver must operate under identical standards so that the receiver can decipher the information sent by the transmitter. By using equipment that conforms to the standards, carriers (companies that build and operate networks) may then mix equipment from different vendors for their networks.

One reason SONET has become so successful is that it was designed so that the integrity of the data stream can be verified, even when live traffic is being transmitted. There are a number of established test equipment vendors building test-sets for analyzing SONET and SDH. Precise measurements of the error performance of the bit stream can be made. Equivalent test equipment can be expected in the future for Ethernet and other standards that may emerge, since test and verification is required to operate a successful network.

Current technology allows for a modulation rate of between 51 Megabits per second ("Mbps") and 10 Gigabits per second ("Gbps"). An increase in the modulation rate results in a spectrally wider channel signal. Consequently, the wider signal and narrower spacing between channels mean that the signals are closer together, and thus harder to separate. As a result, data loss and distortion, such as crosstalk from adjacent signals, may occur.

As greater and greater amounts of data needed to be transmitted, further technological improvements led to the deployment of an improved, higher capacity protocol called dense wavelength division multiplexing ("DWDM"), which allows even more data streams (channels) to be transmitted over a single strand of fiber.

For data quality and system performance analysis, there are a number of very well established test equipment vendors who manufacture test-sets and testing mechanisms for analyzing SONET/SDH networks, as previously indicated. There are also established methods to look at the WDM signal, particularly on a physical layer level. For example, by looking at the WDM spectrum, various anomalies can be determined, such as cross-talk, correct channel wavelength and power levels, channel power equalization, and background noise levels.

Unfortunately, there is no effective way to combine the WDM and the SONET analytical techniques. Further, in the typical situation where there is a particular SONET/SDH (or other) signal of interest in a WDM on a fiber, it is difficult to extract and analyze that individual SONET/SDH (or other) signal.

The difficulty in using contemporary SONET/SDH testing equipment to monitor just one single WDM wavelength resides in the SONET/SDH receivers, which are designed to receive a single SONET/SDH data stream. The receivers therefore cannot be used directly to analyze WDM transmissions. If a WDM signal is directly inputted into a SONET/SDH analyzer, the test set will be unable to extract all the different individual data signals. The output will be meaningless and the test useless. It is not possible to extract each individual wavelength so that each can be analyzed individually.

Each single wavelength or carrier channel may carry upwards of 10 gigabits of data per second, each made up of thousands of tributary channels, called T1 lines. Carriers and equipment vendors find it necessary to be able to analyze each T1 and to verify each for quality. The scale of the challenge is daunting: to monitor all these information channels within the single SONET/SDH carrier channel wavelength, and then to multiply that by up to 81 or more different wavelengths that are possible in a WDM network.

The monitoring and testing generally falls into two analysis categories. One category is analyzing for defects on networks carrying live traffic, also referred to as "in service" testing. If a problem occurs, a network element will signal an alarm, which is transmitted inside the data overhead so that the remainder of the network (and the network operators) can identify the problem and react to it. It is also possible to detect transmission errors since parity checking is usually specified in the standards. By looking at the overhead for alarms and defects, the health and the quality of the circuit can be determined.

The other analysis category is bit error rate ("BER") testing. This is "out-of-service" monitoring that is performed on a line when it is out of service. In that state, there is nothing on the line except what the monitoring tester puts on it. Typically, a pseudo-random test pattern, such as $2^{23}-1$, is utilized to send a number of bits in pseudo-random sequence from one end of the line to the other. It is then possible to identify if any of those bits is received in error at the other end. Note that this out-of-service bit error rate testing needs to be done for every one of those hundreds or thousands of information channels across the plurality of carrier channel wavelengths.

A long felt need therefore remains for a method and apparatus for testing SONET/SDH signals on a WDM network, in which established in-service and out-of-service SONET/SDH testing protocols and capabilities can be advantageously employed in an accurate, rapid, effective, timely, and cost effective manner. A need also remains for a testing capability that is automatic and can therefore execute when and as needed, regardless of operator availability, and is not subject to possible operator error. The same need will exist for the testing of emerging standards that will be carried in WDM channels.

Solutions to problems of this sort have been long sought, but have long eluded those skilled in the art.

DISCLOSURE OF THE INVENTION

The present invention provides a method and apparatus for testing network data signals in an optical wavelength division multiplexing network.

An optical wavelength division multiplexing function and a network analysis function are provided. The optical wavelength division multiplexing function is utilized to produce a single wavelength carrier signal. The single wavelength carrier signal is passed to the network analysis function. The network analysis function is used to perform at least network signal level analysis on the single wavelength carrier signal. The optical wavelength division multiplexing function is then incremented through a plurality of the single wavelength carrier signals, providing faster and more accurate testing of network data signals in optical wavelength division multiplexing networks.

Certain embodiments of the invention have other advantages in addition to or in place of those mentioned above. The advantages will become apparent to those skilled in the art from a reading of the following detailed description when taken with reference to the accompanying drawings.

BEST MODE FOR CARRYING OUT THE INVENTION

Figure 1:
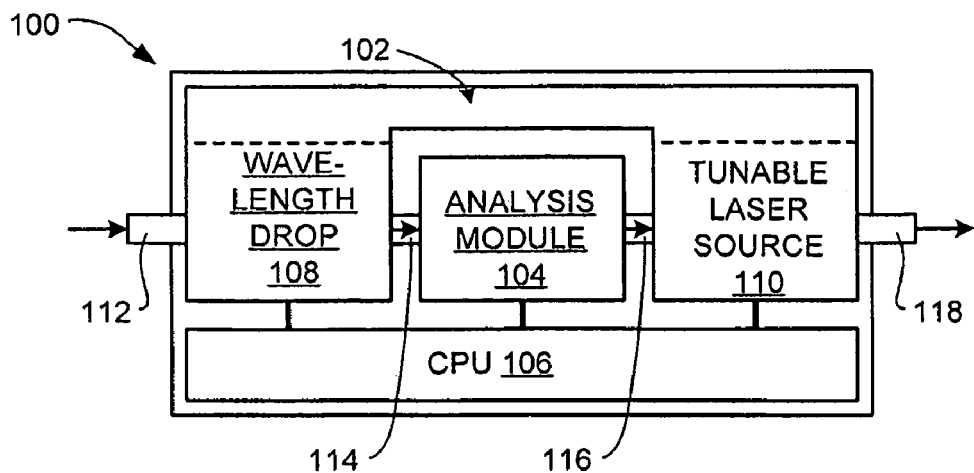
FIG. 1 is a schematic view of a system for testing network data signals in an optical wavelength division multiplexing network.

Referring now to FIG. 1, therein is shown, in schematic form, a system 100 for testing Synchronous Optical NETwork ("SONET") or Synchronous Digital Hierarchy ("SDH") or other data carrying network signals in an optical wavelength division multiplexing network. Current Wavelength Division Multiplexing ("WDM") technology typically allows for up to 81 information signals, each carried on a different wavelength, to travel on a single-mode optical fiber using a single WDM signal. Increases in the number of channels have been accomplished by shrinking the spectral separation between the channels and by adding new channels. The industry has referred to systems with narrow spacing as Dense Wavelength Division Multiplexing or DWDM. The current standards for DWDM signals include 50 GHz (about 0.4 nm) and 100 GHz (about 0.8 nm) between optical channels. The optical networking media includes reports of systems with spacing down to 10 GHz, making possible networks with 1000 or more wavelength channels within the useful spectrum for transmission across optical fibers and through optical amplifiers.

The International Telecommunication Union ("ITU") has defined the wavelengths and wavelength spacing in the G.692 standard. In the ITU wavelength table A.1/G.692 below, nominal central frequencies are based on a 50 GHz minimum channel spacing anchored to a 193.10 THz reference.

TABLE A.1/G.692

| Nominal central frequencies | | |
|---|---|---|
| Nominal central frequencies (THz) for spacings of 50 GHz | Nominal central frequencies (THz) for spacings of 100 GHz and above | Nominal central wavelengths (nm) |
| 196.10 | 196.10 | 1528.77 |
| 196.05 | — | 1529.16 |
| 196.00 | 196.00 | 1529.55 |
| 195.95 | — | 1529.94 |
| 195.90 | 195.90 | 1530.33 |
| 195.85 | — | 1530.72 |
| 195.80 | 195.80 | 1531.12 |
| 195.75 | — | 1531.51 |
| 195.70 | 195.70 | 1531.90 |
| 195.65 | — | 1532.29 |
| 195.60 | 195.60 | 1532.68 |
| 195.55 | — | 1533.07 |
| 195.50 | 195.50 | 1533.47 |
| 195.45 | — | 1533.86 |
| 195.40 | 195.40 | 1534.25 |
| 195.35 | — | 1534.64 |
| 195.30 | 195.30 | 1535.04 |
| 195.25 | — | 1535.43 |

TABLE A.1/G.692-continued

Nominal central frequencies

| Nominal central frequencies (THz) for spacings of 50 GHz | Nominal central frequencies (THz) for spacings of 100 GHz and above | Nominal central wavelengths (nm) |
|---|---|---|
| 195.20 | 195.20 | 1535.82 |
| 195.15 | — | 1536.22 |
| 195.10 | 195.10 | 1536.61 |
| 195.05 | — | 1537.00 |
| 195.00 | 195.00 | 1537.40 |
| 194.95 | — | 1537.79 |
| 194.90 | 194.90 | 1538.19 |
| 194.85 | — | 1538.58 |
| 194.80 | 194.80 | 1538.98 |
| 194.75 | — | 1539.37 |
| 194.70 | 194.70 | 1539.77 |
| 194.65 | — | 1540.16 |
| 194.60 | 194.60 | 1540.56 |
| 194.55 | — | 1540.95 |
| 194.50 | 194.50 | 1541.35 |
| 194.45 | — | 1541.75 |
| 194.40 | 194.40 | 1542.14 |
| 194.35 | — | 1542.54 |
| 194.30 | 194.30 | 1542.94 |
| 194.25 | — | 1543.33 |
| 194.20 | 194.20 | 1543.73 |
| 194.15 | — | 1544.13 |
| 194.10 | 194.10 | 1544.53 |
| 194.05 | — | 1544.92 |
| 194.00 | 194.00 | 1545.32 |
| 193.95 | — | 1545.72 |
| 193.90 | 193.90 | 1546.12 |
| 193.85 | — | 1546.52 |
| 193.80 | 193.80 | 1546.92 |
| 193.75 | — | 1547.32 |
| 193.70 | 193.70 | 1547.72 |
| 193.65 | — | 1548.11 |
| 193.60 | 193.60 | 1548.51 |
| 193.55 | — | 1548.91 |
| 193.50 | 193.50 | 1549.32 |
| 193.45 | — | 1549.72 |
| 193.40 | 193.40 | 1550.12 |
| 193.35 | — | 1550.52 |
| 193.30 | 193.30 | 1550.92 |
| 193.25 | — | 1551.32 |
| 193.20 | 193.20 | 1551.72 |
| 193.15 | — | 1552.12 |
| 193.10 | 193.10 | 1552.52 |
| 193.05 | — | 1552.93 |
| 193.00 | 193.00 | 1553.33 |
| 192.95 | — | 1553.73 |
| 192.90 | 192.90 | 1554.13 |
| 192.85 | — | 1554.54 |
| 192.80 | 192.80 | 1554.94 |
| 192.75 | — | 1555.34 |
| 192.70 | 192.70 | 1555.75 |
| 192.65 | — | 1556.15 |
| 192.60 | 192.60 | 1556.55 |
| 192.55 | — | 1556.96 |
| 192.50 | 192.50 | 1557.36 |
| 192.45 | — | 1557.77 |
| 192.40 | 192.40 | 1558.17 |
| 192.35 | — | 1558.58 |
| 192.30 | 192.30 | 1558.98 |
| 192.25 | — | 1559.39 |
| 192.20 | 192.20 | 1559.79 |
| 192.15 | — | 1560.20 |
| 192.10 | 192.10 | 1560.61 |

NOTE
The endpoints of this table are illustrative only. Future evolutions of multi-channel systems are anticipated to include frequencies beyond those limits.

The system 100, suitable for use on a DWDM network, includes a DWDM module 102 and a network analysis module 104 that provide, respectively, an optical wavelength division multiplexing function and a network analysis function for the system 100. Both the DWDM module 102 and the network analysis module 104 are under the control of suitable control circuitry, such as a computer or central processing unit ("CPU") 106.

The DWDM module 102 includes a wavelength drop section 108 and a tunable laser source 110. The wavelength drop section 108 and the tunable laser source 110 in the DWDM module 102 may be selectably utilized as needed for testing optical signals, as further described below.

Optical signals enter the system 100 through an input 112 that conducts the optical signals to the wavelength drop section 108 of the DWDM module 102. The optical signals are then conducted from the wavelength drop section 108 through a first internal optical coupling 114 to the network analysis module 104. From there, the optical signals are conducted by a second internal optical coupling 116 to the tunable laser source 110 in the DWDM module 102, and from there to an output 118 for the system 100.

The system 100 is configured so that the wavelength drop section 108, the tunable laser source 110, and/or the network analysis module 104 may be selectively bypassed as appropriate for the various tests and analyses to be performed, as further described herein.

A suitable DWDM module is commercially available from Sunrise Telecom (San Jose, Calif.), and suitable network analysis modules may be obtained from Agilent Technologies (Palo Alto, Calif.) and Sunrise Telecom (San Jose, Calif.).

Figure 2:
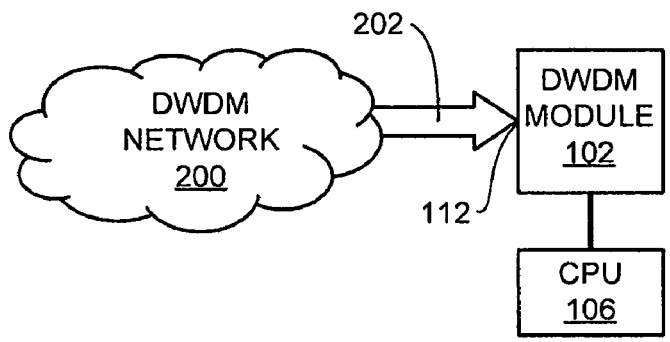
FIG. 2 is a schematic view of a system configuration for channel physical layer analysis and channel discovery for an optical wavelength division multiplexing network.

Referring now to FIG. 2, therein is shown schematically a system configuration for DWDM channel physical layer analysis and channel discovery for a DWDM network 200. For clarity of illustration in this and subsequent Figures, only those portions of the system 100 actively utilized in the configuration being described will be included in the particular drawing Figure. All such configurations are easily enabled under the control of the CPU 106.

As shown in FIG. 2, it is possible to determine initially which channels or wavelengths are available on the DWDM network 200. As is well understood in the art, the DWDM network 200 will have a DWDM signal 202 carried over a single fiber optic cable. That single fiber optical cable will typically be carrying multiple signal wavelengths or channels, all of which are connected by that single fiber to the input 112 for analysis by the DWDM module 102.

The CPU 106 then controls the DWDM module 102 to scan the DWDM signal 202 to see which channels or wavelengths are occupied with information signals. (Alternatively, an operator manually inputs the number and the wavelength of each occupied channel.) This data can then be utilized to determine which channels to monitor or test; that is, the occupied wavelengths become the grid across which the test and monitoring take place.

The DWDM module 102 thus performs a preliminary physical measurement and analysis, identifying the DWDM channels automatically. This step provides for automatically identifying and confirming the occupied channels, thereby optionally eliminating the need to manually determine and verify the occupied wavelengths before proceeding with monitoring, analyzing, and/or testing.

Figure 3:
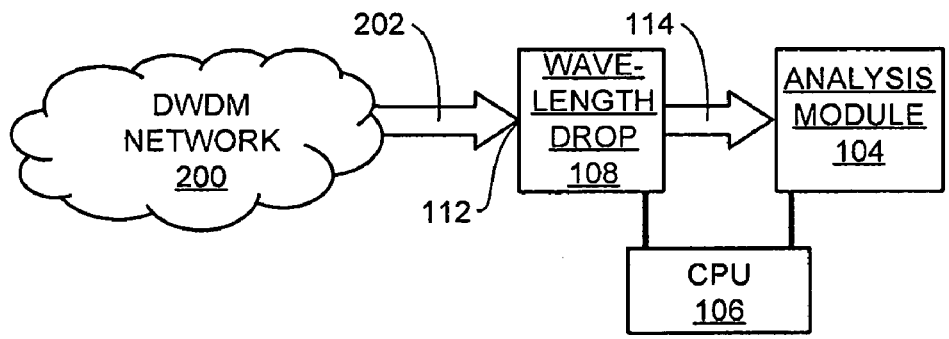
FIG. 3 is a schematic view of a system configuration for in-service monitoring of an optical wavelength division multiplexing network.

Referring now to FIG. 3, therein is shown schematically a system configuration for in-service monitoring of a DWDM network. The DWDM signal 202, provided from the DWDM network 200, is provided to the wavelength drop section 108 of the DWDM module 102. The wavelength drop section 108 is a conventional tunable optical filter that isolates or "drops" a single, specified wavelength, carried on the first internal optical coupling 114, and being output from the wavelength drop section 108 under the control and specification of the CPU 106. The single wavelength is then provided to the network analysis module 104 to monitor the SONET, SDH, or other signals, such as for in-service alarm and defect data.

The network analysis module 104 is itself largely wavelength agnostic, which is both advantageous and disadvantageous. The advantage is that the network analysis module 104 is able to accept and analyze each wavelength without having to be specifically tuned thereto, but the disadvantage is that it can analyze only a single wavelength at a time, thus requiring the wavelength drop section 108. The network analysis module 104 then scans the signal and all tributary channels on the single wavelength, providing mapping, status, alarm, and defect information.

Once the testing for the specified wavelength has been completed and the desired length of time for monitoring has expired, the CPU 106 instructs the DWDM module 102 to change the wavelength drop section 108 to the next occupied wavelength in the list or grid of wavelengths across which the scanning analysis has been specified.

The CPU 106 then commands the network analysis module 104 to begin the testing anew. Once that test is completed, the CPU 106 repeats the cycle again until the entire specified spectrum of the DWDM signal 202 has automatically been scanned and analyzed, without requiring any user or operator intervention or management.

Contrasted with in-service monitoring, out-of-service testing provides greater opportunities for analyzing the condition of the network. With in-service monitoring, the network analysis is relatively passive since live data is being carried on the network. There is thus little opportunity to test the network actively. In contrast, when the network is out-of-service, it can be intelligently perturbed and tested with suitable test signals.

Figure 4:
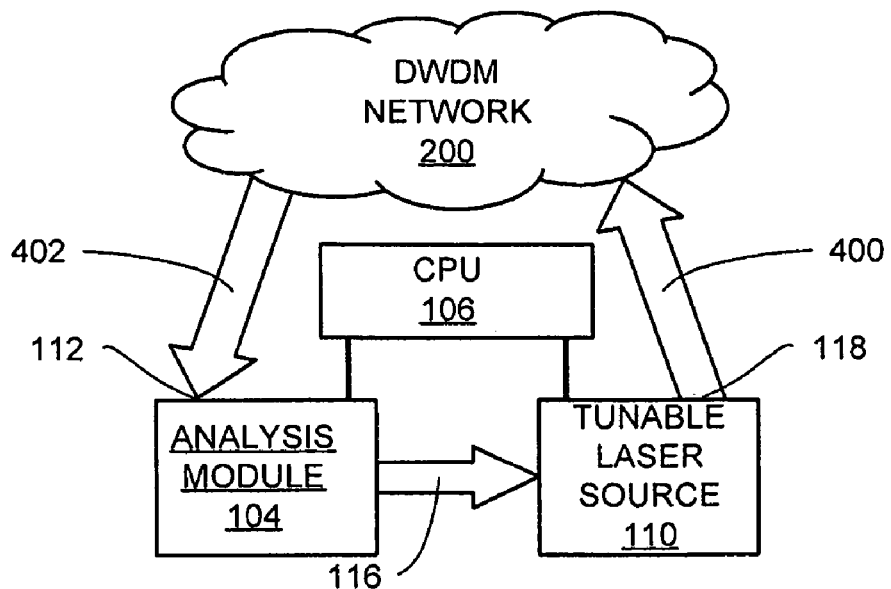
FIG. 4 is a schematic view of a system configuration for out-of-service testing with a single wavelength protocol on an optical wavelength division multiplexing network.

Referring now to FIG. 4, therein is shown schematically a system configuration for out-of-service testing with a single wavelength protocol on a DWDM network. In this configuration, the CPU 106 instructs the network analysis module 104 to send an information signal that contains a test pattern, such as $2^{23}-1$, in its payload, to the tunable laser source 110 in the DWDM module 102. The test pattern signal from the network analysis module 104 is a single wavelength signal (typically at 1310 or 1550 nm), and is not suitable for direct transmission into a carrier channel wavelength of a DWDM network.

Since it is desired to test each of the available channel wavelengths in the DWDM network 200, the CPU 106 then instructs the tunable laser source 110 to convert the wavelength into one of the specified test wavelengths on the DWDM spectrum. The test wavelength signal is then coupled from the output 118 of the system 100 into the DWDM network 200 through an uplink fiber 400.

After passing through the DWDM network 200, the test signal is returned through a downlink fiber 402 to the input 112 of the system 100 and returned to the network analysis module 104.

Since the network analysis module's receiver can receive a wide band of frequencies, typically it will not be necessary to change the wavelength again before going back to the network analysis module 104 for analysis. With this loop in place, the network analysis module 104 can now perform a bit error rate ("BER") test and monitor the particular specified wavelength for data errors.

The test at the specified wavelength or channel continues for the desired time interval (which might be seconds or days in duration). During this test cycle, the network analysis module 104 will typically test each tributary channel within the single wavelength. Then, the CPU 106 instructs the tunable laser source 110 to change to the next specified test wavelength, and instructs the network analysis module 104 to begin the test anew. The CPU 106 then repeats the cycle until all the specified wavelengths in the DWDM network 200 have been automatically scanned and tested.

The system configuration shown in FIG. 4 assumes that there is no other traffic on the DWDM network 200. However, when the DWDM network 200 is not entirely out-of-service, there may be some other traffic on the system line. In that case, the test environment will not contain just the one wavelength that was originally injected into the DWDM network 200 by the tunable laser source 110. Instead, other wavelengths (possibly carrying live data streams) will also be present.

Figure 5:
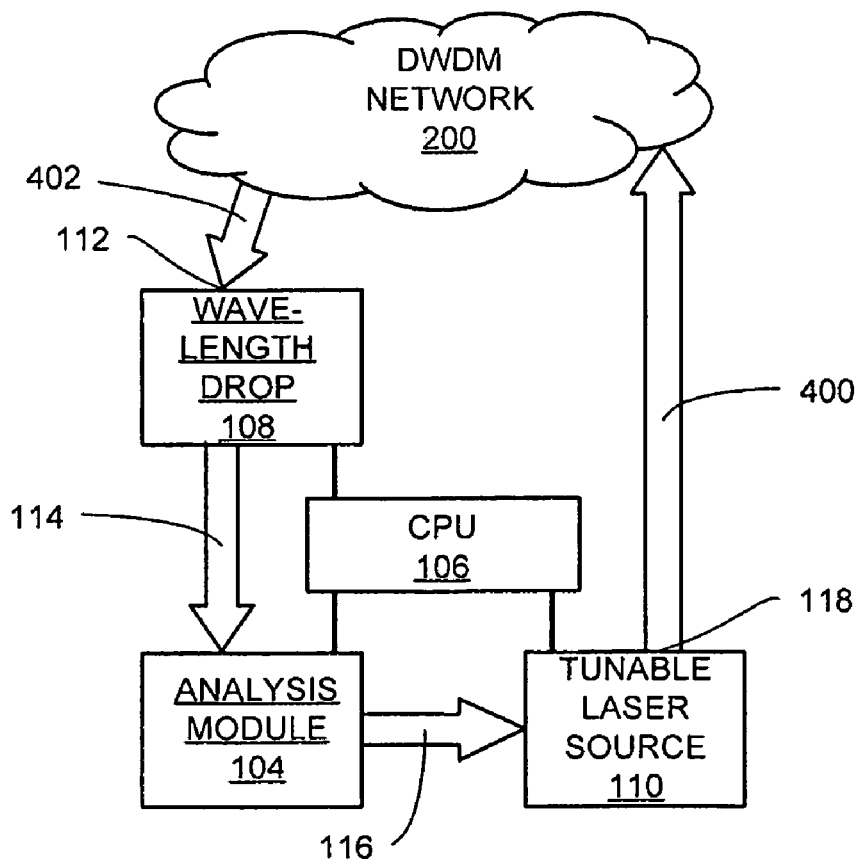
FIG. 5 is a schematic view of the system configuration of FIG. 4 adapted for out-of-service bit error rate testing in the presence of multiple wavelength signals on an optical wavelength division multiplexing network.

Referring now to FIG. 5, therein is shown schematically a system configuration similar to that illustrated in FIG. 4, but adapted for out-of-service bit error rate testing in the presence of multiple wavelength signals on the output from the DWDM network 200. In this case, the wavelength drop section 108 of the DWDM module 102 is actively used, between the downlink fiber 402 and the network analysis module 104.

More specifically, the multiple wavelengths on the downlink fiber 402 enter the system 100 through the input 112 and are processed in the wavelength drop section 108 to send only the single wavelength of interest to the network analysis module 104 through the first internal optical coupling 114. This will typically be the same wavelength frequency that previously had been injected into the uplink fiber 400 by the tunable laser source 110, but may be a different wavelength. (For example, the DWDM network 200 may transpose an information signal onto a different wavelength, and the wavelength drop section 108 will then be configured so that the system verifies that the transposition was performed properly.) Upon completion of testing at the wavelength(s) of interest, the tunable laser source 110 and the wavelength drop section 108 are incremented to the next desired wavelength(s) by the CPU 106, similarly as the system described for FIG. 4.

Figure 6:
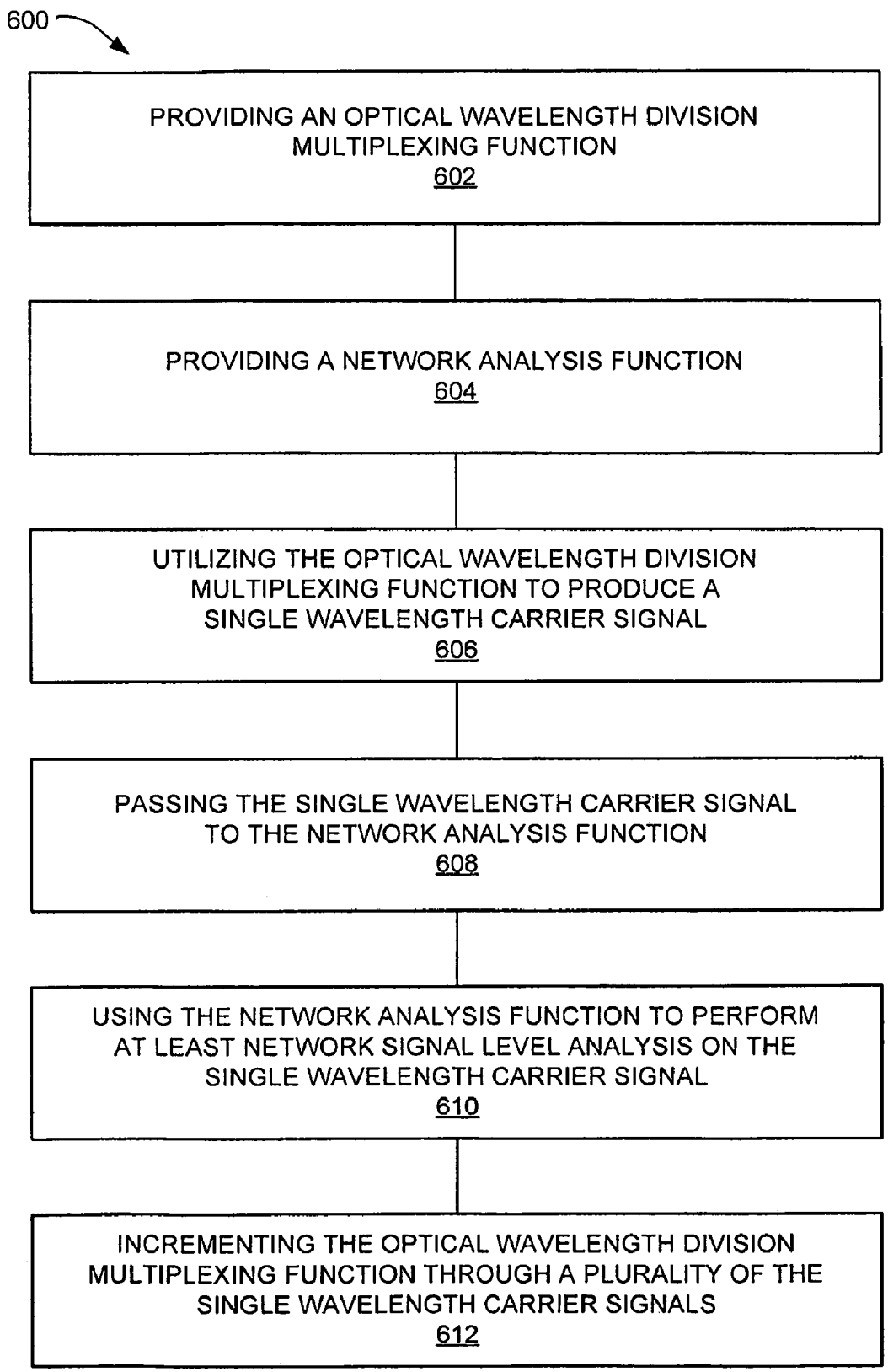
FIG. 6 is a flow chart of a method for testing network data signals in an optical wavelength division multiplexing network.

Referring now to FIG. 6, therein is shown a flow chart of a method 600 for testing network data signals in an optical wavelength division multiplexing network in accordance with the present invention. The method includes a step 602 of providing an optical wavelength division multiplexing function; a step 604 of providing a network analysis function; a step 606 of utilizing the optical wavelength division multiplexing function to produce a single wavelength carrier signal; a step 608 of passing the single wavelength carrier signal to the network analysis function; a step 610 of using the network analysis function to perform at least network signal level analysis on the single wavelength carrier signal; and a step 612 of incrementing the optical wavelength division multiplexing function through a plurality of the single wavelength carrier signals.

It has been discovered that, by integrating the functionality of the DWDM module 102 with the functionality of the network analysis module 104, according to the needs at hand as described above, a powerful and fully automated system is provided.

The CPU 106 supervises an automated "one-button comprehensive test" for fully analyzing SONET/SDH signals, or potentially other information signals, in optical wavelength division multiplexing transmissions without requiring continual operator intervention and manual supervision.

Further, the exact depth of testing can be designated, from basic to a thorough test of each individual T1 line, or even individual voice channels. Further, in addition to being able to specify how deeply the scan is to go, the profile of the specific channels (which to include and which to exclude) can be specified and then executed automatically under the control of the CPU 106. The ability to provide timely data of this quality affords real-time monitoring, opening the possibility for network designs that can be self-healing.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hitherto-fore set forth herein or shown in the accompanying drawings are to be interpreted in an illustrative and non-limiting sense.

The invention claimed is:

1. A method for testing network data signals in an optical wavelength division multiplexing network, comprising:
providing an optical wavelength division multiplexing function;
providing a network analysis function;
utilizing the optical wavelength division multiplexing function to produce a single wavelength carrier signal;
passing the single wavelength carrier signal to the network analysis function;
using the network analysis function to perform at least network signal level analysis on the single wavelength carrier signal;
incrementing the optical wavelength division multiplexing function through a plurality of the single wavelength carrier signals; and
performing out-of-service bit error rate testing on an optical wavelength division multiplexing network by:
utilizing the network analysis function on to generate a test signal;
utilizing the optical wavelength division multiplexing function to convert the test signal to the single wavelength carrier signal;
passing the test signal on the single wavelength carrier signal through the optical wavelength division multiplexing network;
receiving the test signal from the optical wavelength division multiplexing network into the network analysis function; and
analyzing the received test signal to determine the condition of the optical wavelength division multiplexing network.

2. The method of claim 1 further comprising utilizing the optical wavelength division multiplexing function to scan an optical wavelength division multiplexing signal received from an optical wavelength division multiplexing network to determine which carrier signal wavelengths are occupied on the optical wavelength division multiplexing network.

3. The method of claim 1 further comprising, in the receiving step:
receiving the test signal on the single wavelength carrier signal from a signal on the optical wavelength division multiplexing network; and
utilizing the optical wavelength division multiplexing function to produce only the single wavelength carrier signal from the signal received from the optical wavelength division multiplexing network.

4. A method for testing network data signals in an optical wavelength division multiplexing network, comprising:
providing an optical wavelength division multiplexing function;
providing a network analysis function;
providing a CPU connected to control the optical wavelength division multiplexing function and the network analysis function;
controlling the optical wavelength division multiplexing function to produce a single wavelength carrier signal;
passing the single wavelength carrier signal to the network analysis function;
controlling the network analysis function to perform at least network signal level analysis on the single wavelength carrier signal;
using the CPU to increment the optical wavelength division multiplexing function through a plurality of the single wavelength carrier signals; and
performing out-of-service bit error rate testing on an optical wavelength division multiplexing network by:
utilizing the network analysis function to generate a test signal;
utilizing the optical wavelength division multiplexing function to convert the test signal to the single wavelength carrier signal;
passing the test signal on the single wavelength carrier signal through the optical wavelength division multiplexing network;
receiving the test signal from the optical wavelength division multiplexing network into the network analysis function; and
analyzing the received test signal to determine the condition of the optical wavelength division multiplexing network.

5. The method of claim 4 further comprising utilizing the optical wavelength division multiplexing function to scan an optical wavelength division multiplexing signal received from an optical wavelength division multiplexing network to determine which carrier signal wavelengths are occupied on the optical wavelength division multiplexing network.

6. The method of claim 4 further comprising, in the receiving step:
receiving the test signal on the single wavelength carrier signal from a signal on the optical wavelength division multiplexing network; and
utilizing the optical wavelength division multiplexing function to produce only the single wavelength carrier signal from the signal received from the optical wavelength division multiplexing network.

7. A testing system for network data signals in an optical wavelength division multiplexing network, comprising:
an optical wavelength division multiplexing function;
a network analysis function; and
control circuitry for:
utilizing the optical wavelength division multiplexing function to produce a single wavelength carrier signal and passing the single wavelength carrier signal to the network analysis function;
using the network analysis function to perform at least network signal level analysis on the single wavelength carrier signal; and
incrementing the optical wavelength division multiplexing function through a plurality of the single wavelength carrier signals; and
wherein the control circuitry controls the optical wavelength division multiplexing function and the network analysis function to perform out-of-service bit error rate testing on an optical wavelength division multiplexing network by:
  utilizing the network analysis function to generate a test signal;
  utilizing the optical wavelength division multiplexing function to convert the test signal to the single wavelength carrier signal;
  passing the test signal on the single wavelength carrier signal through the optical wavelength division multiplexing network;
  receiving the test signal from the optical wavelength division multiplexing network into the network analysis function; and
  analyzing the received test signal to determine the condition of the optical wavelength division multiplexing network.

8. The system of claim 7 wherein the control circuitry utilizes the optical wavelength division multiplexing function to scan an optical wavelength division multiplexing signal received from an optical wavelength division multiplexing network to determine which carrier signal wavelengths are occupied on the optical wavelength division multiplexing network.

9. The system of claim 7 wherein the control circuitry controls the optical wavelength division multiplexing function and the network analysis function to receive the test signal from the optical wavelength division multiplexing network into the network analysis function by:
  receiving the test signal on the single wavelength carrier signal from the signal on the optical wavelength division multiplexing network; and
  utilizing the optical wavelength division multiplexing function to produce only the single wavelength carrier signal from the signal received from the optical wavelength division multiplexing network.

10. A testing system for network data signals in an optical wavelength division multiplexing network, comprising:
  an optical wavelength division multiplexing function;
  a network analysis function; and
  a CPU connected to control the optical wavelength division multiplexing function and the network analysis function to:
    control the optical wavelength division multiplexing function to produce a single wavelength carrier signal and pass the single wavelength carrier signal to the network analysis function;
    control the network analysis function to perform at least network signal level analysis on the single wavelength carrier signal; and
    increment the optical wavelength division multiplexing function through a plurality of the single wavelength carrier signals; and
  wherein the CPU controls the optical wavelength division multiplexing function and the network analysis function to perform out-of-service bit error rate testing on an optical wavelength division multiplexing network by:
    utilizing the network analysis function to generate a test signal;
    utilizing the optical wavelength division multiplexing function to convert the test signal to the single wavelength carrier signal;
    passing the test signal on the single wavelength carrier signal through the optical wavelength division multiplexing network;
    receiving the test signal from the optical wavelength division multiplexing network into the network analysis function; and
    analyzing the received test signal to determine the condition of the optical wavelength division multiplexing network.

11. The system of claim 10 wherein the CPU utilizes the optical wavelength division multiplexing function to scan an optical wavelength division multiplexing signal received from an optical wavelength division multiplexing network to determine which carrier signal wavelengths are occupied on the optical wavelength division multiplexing network.

12. The system of claim 10 wherein the CPU controls the optical wavelength division multiplexing function and the network analysis function to receive the test signal from the optical wavelength division multiplexing network into the network analysis function by:
  receiving the test signal on the single wavelength carrier signal from the signal on the optical wavelength division multiplexing network; and
  utilizing the optical wavelength division multiplexing function to produce only the single wavelength carrier signal from the signal received from the optical wavelength division multiplexing network.

* * * * *